UNITED STATES PATENT OFFICE.

HUGO PRINZ, OF FRANKFORT-ON-THE-MAIN, GERMANY, ASSIGNOR TO FARBFABRIK, VORMALS BRÖNNER, OF SAME PLACE.

RED COLORING-MATTER FROM BETANAPHTHYLAMINE SULPHO-ACID.

SPECIFICATION forming part of Letters Patent No. 332,830, dated December 22, 1885.

Application filed May 8, 1884. Serial No. 130,799. (Specimens.) Patented in Germany July 5, 1882, No. 22,547; in Belgium July 17, 1882, No. 58,501; in England August 4, 1882, No. 3,724; in France August 5, 1882, No. 150,503, and in Luxemburg March 19, 1883, No. 268.

*To all whom it may concern:*

Be it known that I, Dr. HUGO PRINZ, a subject of the Emperor of Germany, and resident at Frankfort-on-the-Main, Germany, have invented new and useful Improvements in Coloring-Matter, of which the following is a specification.

If betanaphthol monosulpho-acid is acted upon by ammonia a betanaphthylamine sulpho-acid is produced, as fully described in my application for United States Letters Patent, Serial No. 130,431, filed May 5, 1884.

The present invention consists in the production of a red cochineal coloring-matter by combining betanaphthol disulpho-acid with the diazo combinations of the aforesaid betanaphthylamine sulpho-acid.

The method of effecting the combinations is as follows: Fifty-five kilograms betanaphthylamine monosulphurous sodium are dissolved in five hundred liters of hot water. To this are added sixty kilograms of muriatic acid, (of specific gravity 1.19,) and the whole cooled down to 5°. The naphthylamine sulpho-acid separated by the above process has now added to it a watery solution of sixteen kilograms of sodium nitrite. The diazo combinations thus obtained are gradually mixed with eighty-five kilograms betanaphthol disulphurous sodium.

By "naphthol disulphurous sodium" I understand the mixture of sodium salts of both the isomeric naphthol disulpho-acids, which are obtained by sulphurating betanaphthol, betanaphthol monosulphurous-acid salts, or betadinaphthyl ether.

The coloring-matter obtained by mixing the above-described solutions is precipitated by salt, pressed and purified by solution.

The thus-obtained coloring-matter differs, essentially, in its properties from similar products hitherto known. It dissolves in concentrated sulphuric acid with a cherry-red color, while on the other hand the coloring-matter described in Coro's patent, Reissue No. 9,144, dated April 6, 1880, dissolves in sulphuric acid with a violet color, and the coloring-matter described in Baum's patent, No. 251,164, dated December 20, 1881, dissolves in sulphuric acid with a greenish color.

Treated with tin and muriatic acid, the herein-claimed new coloring-matter gives the new betanaphthylamine sulpho-acid and the disulpho-acids of amidobetanaphthol.

Having thus described my invention and the manner of employing the same, I claim—

1. The method of producing a red coloring-matter by combining betanaphthol disulpho-acid with the diazo combinations of betanaphthylamine sulpho-acid which has been produced by treating betanaphthol sulpho-acid with ammonia, substantially as herein described.

2. The new red coloring-matter herein described, having the properties of dissolving in concentrated sulphuric acid with a cherry-red color, and which when treated with tin and muriatic acid forms betanaphthylamine sulpho-acid and the disulpho-acids of amidobetanaphthol, substantially as herein set forth.

In testimony whereof I have signed my name to this specification in the presence of two subscribing witnesses.

HUGO PRINZ.

Witnesses:
FRANZ WIRTH,
FRANZ HASSLACHER.